Oct. 1, 1929.                J. M. BELL                1,729,921
                            AIR BRAKE TOOL
                         Filed April 30, 1928
Fig. 1.
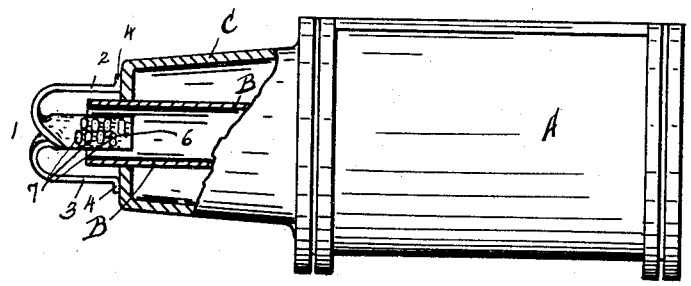
Fig. 2.        Fig. 3.
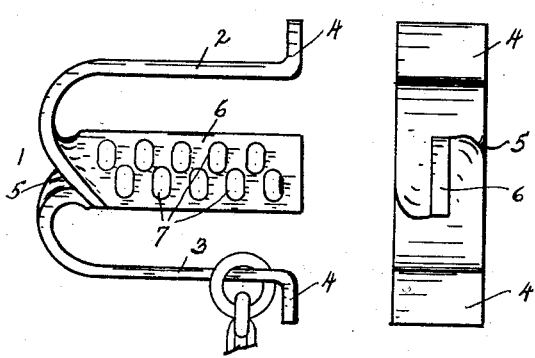    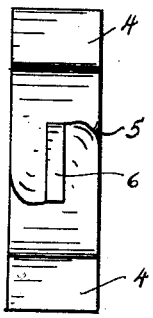
Fig. 4.
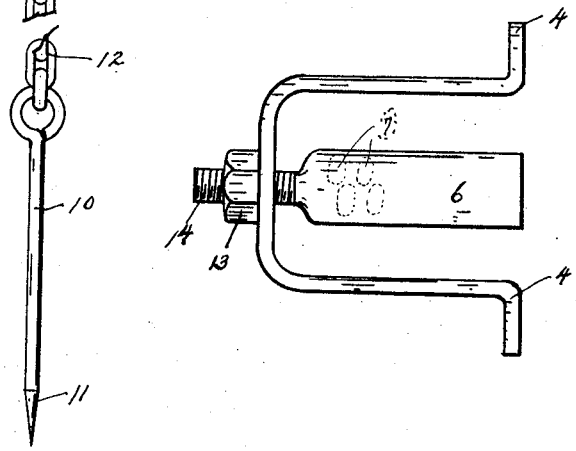
Inventor
James M. Bell.
By  R. M. Thomas
                Attorney Patented Oct. 1, 1929

1,729,921

UNITED STATES PATENT OFFICE

JAMES M. BELL, OF SALT LAKE CITY, UTAH

AIR-BRAKE TOOL

Application filed April 30, 1928. Serial No. 273,923.

My invention relates to air brake equipment and has for its object to provide a new and efficient tool for holding the spring and piston in the head of an air brake cylinder while the cylinder is being cleaned or the packing renewed.

A still further object is to provide a holding tool which will fit within the cylindrical piston tube and which will have a series of offset elongated holes therethrough adapted to have a pin passed through said holes and the hole in the tube to hold the tube, spring and entire assembly intact and rigidly secure while the piston is being removed to either repair or clean the cylinder of an air brake.

A still further object is to provide a holding tool for use in air brake equipment which will be economical to manufacture and one which, when used, will eliminate much breakage of the packing leather of the piston.

A still further object is to provide a tool which will save much time and labor and which will eliminate the hazard of cleaning the brake cylinder of air brake equipment.

These objects I accomplish with the device illustrated in the accompanying drawings, in which similar numerals and letters of reference indicate like parts throughout the several views and as described in the specification forming a part of this application and pointed out in the appended claims.

In the drawings, in which I have shown the best and most preferred manner of building my invention, Figure 1 is a side elevation of an air brake cylinder with my device in place showing parts sectioned. Figure 2 is a side elevation of my device with the pin attached thereto by a chain. Figure 3 is a front view of the device. Figure 4 is a modification of my device showing the different form in which the tool can be made without departing from the spirit of the invention or the scope of the claims.

In the drawings I have shown the air brake cylinder as A, with the piston tube shown as B. My device is made by bending a flat piece of metal into a U-shaped body member 1, having the legs 2 and 3 thereof provided with foot pieces 4, which foot pieces 4 are adapted to engage with the end of the cylindrical housing C of the air brake equipment. The said piece of metal is bent back upon itself at 5 and welded together to form a central leg 6, which leg 6 is of the approximate length of the legs 2 and 3, and is spaced equally between them, with the width thereof at right angles to the width of the legs. I then provide elongated or oblong holes 7 through the said leg 6, and the said holes are staggered as to each other to adapt the device to fit any hole in the piston tube or any position of the said hole. Each of the piston tubes in the standard air brake equipment is provided with a hole diametrically therethrough which, in the intention of the manufacturers, is sufficient to pass a bar therethrough to hold the tube B, but in most cases the hole is not in the correct position for that to be done.

I then provide a pin 10, which pin 10 is provided with a tapered end 11, so that the pin can be started through a hole even though the holes 7 in the leg 6 are not in direct alinement with the hole in the piston tube B. The said pin 10 may be secured to the device by a chain 12 or may be used independently therefrom.

In Figure 4 of the drawings I have shown a modified form of the device in which the central leg 6 is passed through a hole in the body member 1 and is made with a threaded end 14 thereon on which a nut 13 is screwed, making the leg 6 adjustable as to length.

The operation of my device is as follows:—

The foot pieces 4 are placed against the end of the housing C with the central leg 6 within the tube B. The pin 10 is then passed through the hole in the tube and through the hole 7 in the leg 6, which is nearest in alinement with the hole in the tube. The cylinder may then be dismantled and cleaned and replaced without danger of the spring escaping or slipping so that the device could not be reassembled as easily as it is taken apart.

Having thus described my invention I desire to secure by Letters Patent and claim:—

1. In a tool of the class described the combination of a U-shaped body member, having a central leg therein, with elongated staggered holes therethrough; and a pin adapted to be passed through one of said holes in the central leg to hold an air brake piston and its assembly intact while the cylinder is being cleaned.

2. In a tool of the class described the combination of a U-shaped body member; a central leg therein spaced equally from the legs of the body member and with staggered holes therethrough adapted to have a pin passed therein to hold the piston of an air brake cylinder.

3. In a tool for holding air brake equipment the combination of a U-shaped body member; and an adjustable central leg therein having staggered holes therethrough; and a pin adapted to be passed through said holes to hold the piston of an air brake cylinder.

In testimony whereof I have affixed my signature.

JAMES M. BELL.